United States Patent
Abatzoglou et al.

(10) Patent No.: US 6,436,161 B1
(45) Date of Patent: Aug. 20, 2002

(54) MOBILE GRANULAR BED FILTRATION APPARATUS FOR HOT GAS CONDITIONING

(75) Inventors: Nicolas Abatzoglou, Rock Forest; Jacques Bureau, Sherbrooke; Aca Mincic, Ascot; Esteban Chornet, Sherbrooke, all of (CA)

(73) Assignee: Kemestrie Inc., Sherbrooke (CA)

( * ) Notice: Subject to any disclaimer, the term of this patent is extended or adjusted under 35 U.S.C. 154(b) by 0 days.

(21) Appl. No.: 09/972,684

(22) Filed: Oct. 5, 2001

Related U.S. Application Data

(63) Continuation of application No. PCT/CA00/00389, filed on Apr. 7, 2000.

(30) Foreign Application Priority Data

Apr. 7, 1999 (CA) .............................................. 2268376
Sep. 2, 1999 (ES) .............................................. 9901970

(51) Int. Cl.[7] .............................................. B01D 53/06
(52) U.S. Cl. .............................. 55/419; 55/474; 55/512; 96/150
(58) Field of Search .......................... 55/418, 419, 474, 55/512; 96/150; 95/107, 108

(56) References Cited

U.S. PATENT DOCUMENTS 4,126,435 A * 11/1978 Reese ........................ 55/474
4,142,873 A    3/1979 Berz ........................... 96/150
4,191,544 A    3/1980 Boll et al. .................... 55/390
6,290,752 B1 * 9/2001 Koller et al. .................. 55/338

* cited by examiner

Primary Examiner—Robert A. Hopkins
(74) Attorney, Agent, or Firm—Darby & Darby

(57) ABSTRACT

Provided herein is a granular filtration apparatus for the removal of particulate material from hot gas by contacting said hot gas with granular filtration material. The apparatus being of the type having a filtration chamber containing granular filtration material and having a tapered lower portion comprising at least one inlet tubing for feeding therein hot gases to be filtered and at least one outlet tubing for drawing filtered hot gas. The main feature of the present invention consists in a filtration unit mounted in the filtration chamber above each inlet tubing. The filtration unit comprising a first tubular member mounted above the inlet tubing so as to prevent granular material from entering or blocking said inlet tubing and a second tubular member having a bottom and a top end and being mounted essentially in a co-axial and spaced relationship above the first tubular member. During operation, the granular filtration material is siphoned up and fluidized by the hot gases as they travel up the second tubular member, the granular filtration material enters the bottom end of the second tubular member through the space between the first and second tubular member, exits at the top end of the of the second tubular member and falls outside the second tubular member and towards the tapered lower portion of the filtration chamber to be eventually recirculated and fluidized by the hot gases.

10 Claims, 6 Drawing Sheets

MOBILE GRANULAR BED FILTRATION APPARATUS FOR HOT GAS CONDITIONING

This application is a continuation of international application Ser. No. PCT/CA00/00389, filed Apr. 7, 2000, the entire disclosure of which is hereby incorporated by reference.

BACKGROUND OF THE INVENTION

1. Field of the Invention

The present invention relates to the treatment of hot gases from either combustion, gasification or pyrolysis processes. More specifically, the invention relates to a granular bed filtration apparatus for conditioning the above said gases.

2. Description of the Prior Art

Classical power plants and incinerators produce electrical power by generating steam with hot combustion gases in a boiler and using the steam to drive steam turbines. Advanced high efficiency power generation methods are based on gasification or pyrolysis of appropriate feedstocks and use of the resulting synthetic gas either in burners coupled with gas turbines or in internal combustion engines. The gas turbines fed with hot combustion gases are prone to rapid deterioration because of particulate and corrosive particles contained in the combustion gases. Thus, it is necessary to filter and otherwise condition the hot combustion gases before their entry into the power turbines.

In a preliminary treatment, hot gases exiting a combustion chamber are generally submitted to a cyclonic treatment to remove particulate material larger than about 10 $\mu$m. Smaller particles remain in the gas stream and must also be removed to avoid corrosion, pitting and other deterioration of the turbines. These smaller particles are the target of specialized hot gas filters.

A variety of hot gas filters are known. One branch of prior art is concerned with fixed bed filters. In a fixed bed filter, hot gases pass through a mass of filtering granules. These filters require frequent cleaning and regeneration of the filtering media as the filters quickly become plugged.

Another branch of prior art is concerned with mobile bed filtering equipment where the filtering granules are constantly moved. Movement is generally achieved by pneumatic recirculation and gravitational cascade between baffles. This technique allows better interception of small particulate matter and allows filtering granule regeneration without interrupting the filtering operation. For example, U.S. Pat. No. 4,017,278 proposes the use of two concentric vertical cylindrical parts. The inner wall being perforated to permit only the passage of the gas while the outer wall is appropriately louvered to allow particles passing through with the gas while maintaining granular filtering material trapped in the annular space and in continuous movement downwards. The granules leaving the filter from the bottom of the filter being recycled back pneumatically after being cleaned in a cyclonic collector. However, the recirculation of filtration particles requires additional energy and instrumentation.

Yet another branch of prior art is concerned with fluid-bed filters. In fluid-bed filters, the filtering material is kept fluidized by the flow of hot gas. For example, U.S. Pat. No. 4,157,959 proposes a three-stage filtration method. In a first stage a cylindrical fixed bed of granules is used to filter out particles from an upward flowing gas stream; during this operation a particles layer (cake) is built at the bottom of the fixed bed, which is kept immobile by means of an adjustable rod/plate combination. In a second stage, the plate is raised, allowing the particle bed to be converted to a bubbling fluidized one. The filtration continues up to maximum allowable pressure drop occurring when the filter requires cleaning. In the last and third step, the filtering granules are regenerated. The main drawback of such technique is the requirement for moving parts and the downtime associated with filtering granule regeneration.

Thus, despite advances in the art, there remains an important need for an improved hot gas filtration system capable of overcoming the drawbacks of the prior art.

One object of the present invention is to provide a hot gas filtration apparatus which combines the benefits of a mobile granular filtration bed and a fluidized bed.

A further object is to provide a hot gas filtration apparatus capable of operating at elevated temperatures and preferably without moving parts and without the requirement for recirculating pumps.

SUMMARY OF THE INVENTION

The present invention provides a granular filtration apparatus for the removal of particulate material from hot gas by contacting said hot gas with granular filtration material. The apparatus being of the type having a filtration chamber containing granular filtration material and having a tapered lower portion comprising at least one inlet tubing for feeding therein hot gases to be filtered and at least one outlet tubing for drawing filtered hot gas. The main features of the present invention consist of a filtration unit mounted in the filtration chamber above each inlet tubing. The filtration unit comprising a first tubular member mounted above the inlet tubing so as to prevent granular material from entering or blocking said inlet tubing and a second tubular member having a bottom and a top end and being mounted essentially in a co-axial and spaced relationship above the first tubular member. During operation, the granular filtration material is siphoned up and fluidized by the hot gases as they travel up the second tubular member, the granular filtration material enters the bottom end of the second tubular member through the space between the first and second tubular member, exits at the top end of the second tubular member and falls to the tapered lower portion of the filtration chamber to be eventually recirculated and fluidized by the hot gases.

The invention also provides a novel gas inlet distribution plate fastened between the bottom tapered portion of the filtration chamber. The distribution plate is provided with a plurality of gas distribution tuyeres and is encased with the first tubular member as described above.

Other features and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DETAILED DESCRIPTION OF THE INVENTION

Before describing the present invention in detail, it is to be understood that the invention is not limited in its application to the details of construction and parts illustrated in the accompanying drawings and described herein. The invention is capable of other embodiments and of being practiced in various ways. It is also to be understood that the phraseology or terminology used herein is for the purpose of description and not limitation.

The present invention provides a novel hot gas filter for recuperating particulate matter in hot gas prior to its use. The filter of the present invention combines the operation of a fluidized bed filter with a slowly moving granular bed filter. Thus, in operation, the filtration bed of the filter of the present invention is mobile, homogenized and its surface is being renewed continuously.

Unlike other mobile granular bed filters, the filter of the present invention has no internal or external mobile mechanical parts. This feature is advantageous since it avoids mechanical sealing and operation failures due to high temperatures and frequently chemically aggressive environments.

Figure 1:
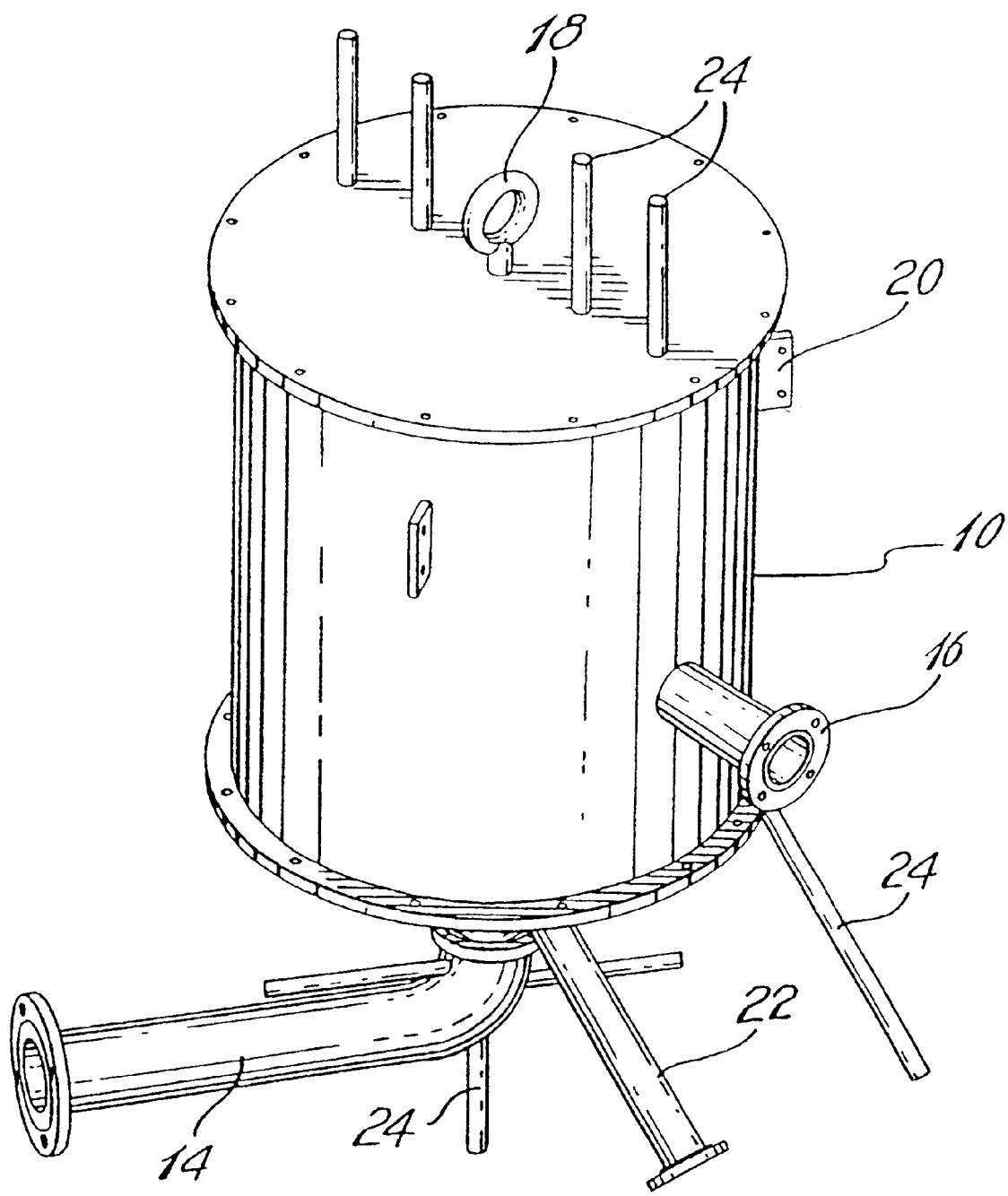
FIG. 1 is a perspective view of the filter of the present invention.
Figure 2:
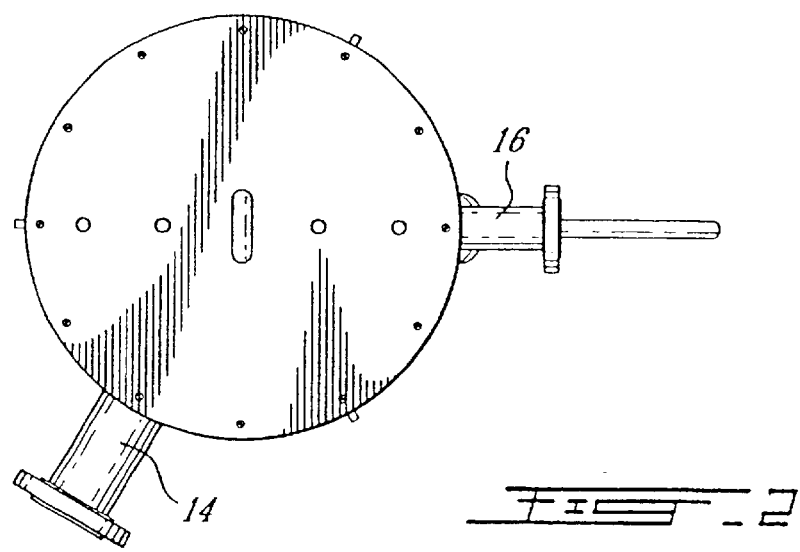
FIG. 2 is a top view of the filter.
Figure 3:
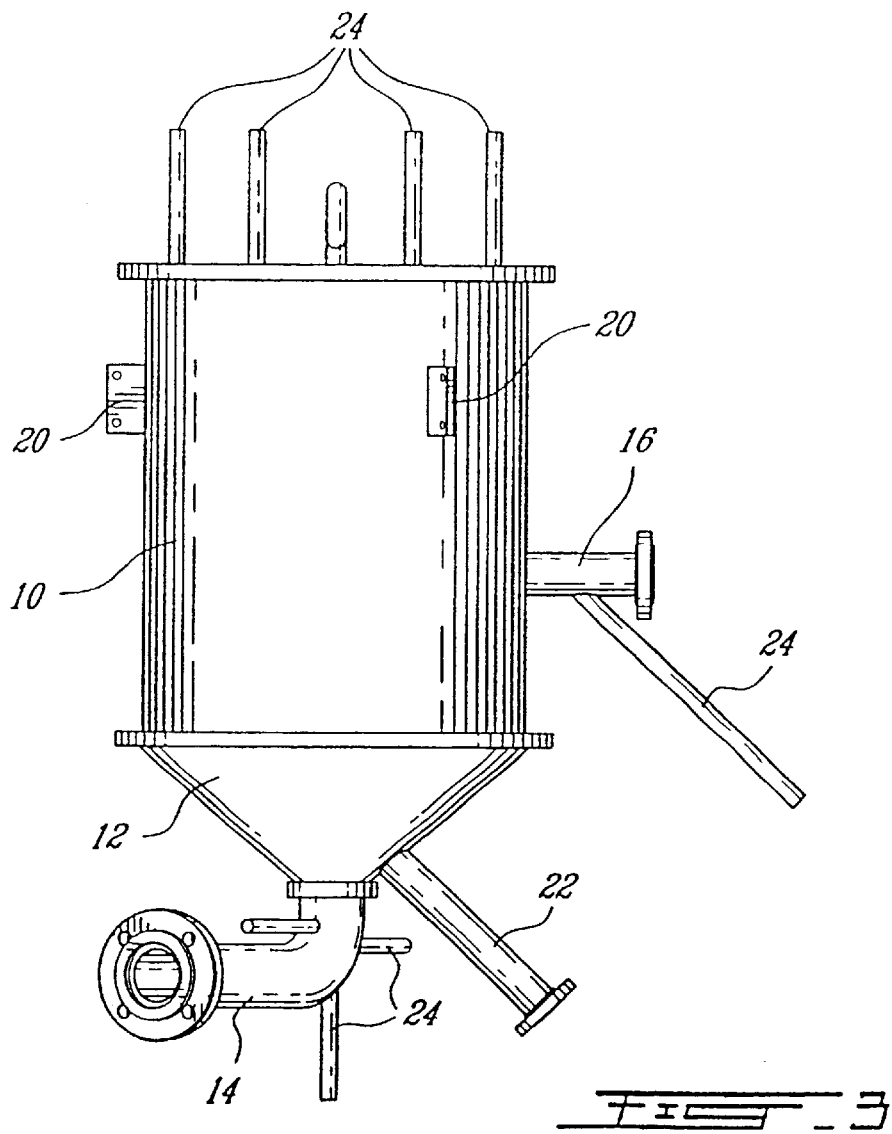
FIG. 3 is a side elevation view of the filter.

Now referring to the drawings, more specifically to FIGS. 1, 2 and 3 the present invention comprises a cylindrical vessel 10 with a conical shape bottom 12. The vessel contains granular filtering material. Advantageously, the granular filtering material can be quartz, preferably 24 mesh size, or sand, preferably of high sphericity and preferably also 24 mesh size. Of course, other granular filtration material may also be used.

A hot gas inlet 14 is operatively connected to bottom 12. A filtered gas outlet 16 is situated in the vertical wall of vessel 10. It is to be understood that the number of gas inlets and outlets is a function of the size of the vessel. For vessels of diameter less than 1 m, 1–2 inlets and outlets are sufficient while for bigger vessels, up to 4 outlets are recommended.

During installation, vessel 10 is moved into position while suspended on loop 18. Anchor plates 20 secure the vessel to a rigid holding structure (not shown).

Spent particulate material can be removed through pipe 22. This removal can be assisted by backflushing pipes 24 which are connected to a compressed air or inert gas source.

Figure 4:
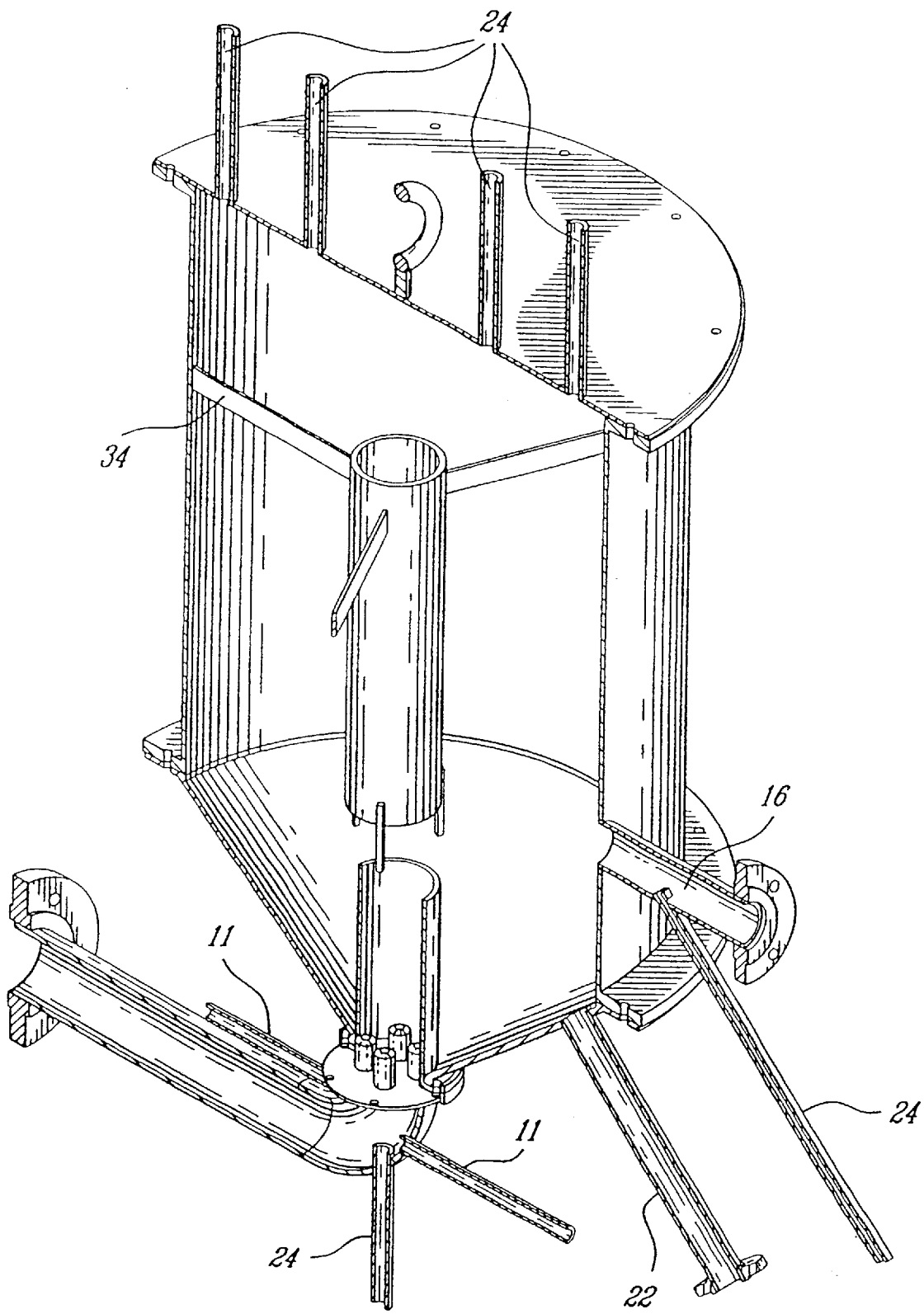
FIG. 4 is cut-away perspective view of the filter showing internal components.
Figure 5:
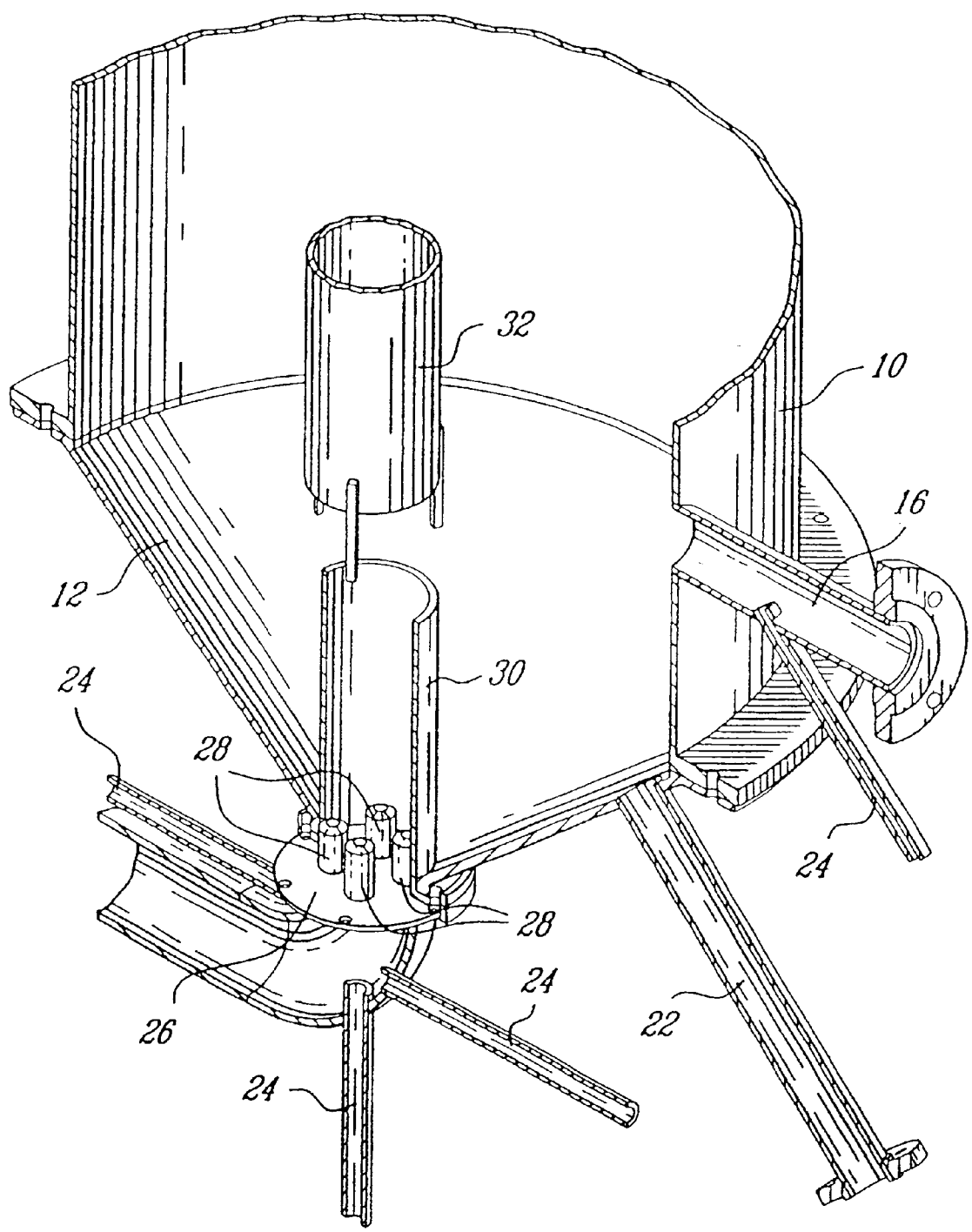
FIG. 5 is a magnified view of FIG. 4 showing in detail the hot gas feed to the filter.

Referring now to FIG. 4, there is shown a cross-sectional view of the inside of vessel 10.

Inlet 14 is provided with a gas distribution plate 26 comprising a number of tuyeres 28 favoring equal gas distribution. Gas entering vessel 10 through tuyeres 28 travels up a tube 30 having on open top. Directly above tube 30 is tube 32, open at both ends. Tubes 30 and 32 are co-axial and of equal diameter. Fluidization of particulate filtration material takes place in tubes 30 and 32. The vertical spacing between tubes 30 and 32 will depend on the filtering material used and it usually varies between 5–10 cm. Highly spherical materials require a small amount of vertical spacing while easily bridging granules necessitates a greater vertical spacing.

Tube 30 is fastened to gas distribution plate 26. Tube 32 is fastened to the internal wall of vessel 10 by support rods 34.

Although the preferred shape of tubes 30 and 32 is that of a cylinder, it is to be understood that the exact shape of tubes 30 and 32 can be varied at will so long as the general shape remains tubular. For example, cylinders 30 and 32 could have elliptical, triangular or square cross-sections.

The exact position of gas outlet 16 including its height from the bottom of the vessel is a function of various parameters. These parameters include: the total height of the central fluid-bed tubes 30 and 32, the vertical position of the spacing between the tubes 30 and 32, the nature and total height of the bed of filtering material. The successful operation of the filter depends on an appropriate balance between head pressure and pressure loss across the bed. Advantageously, the pressure drop across the fluidized bed will be about 0,05 to 0,20 atm.

Figure 6:
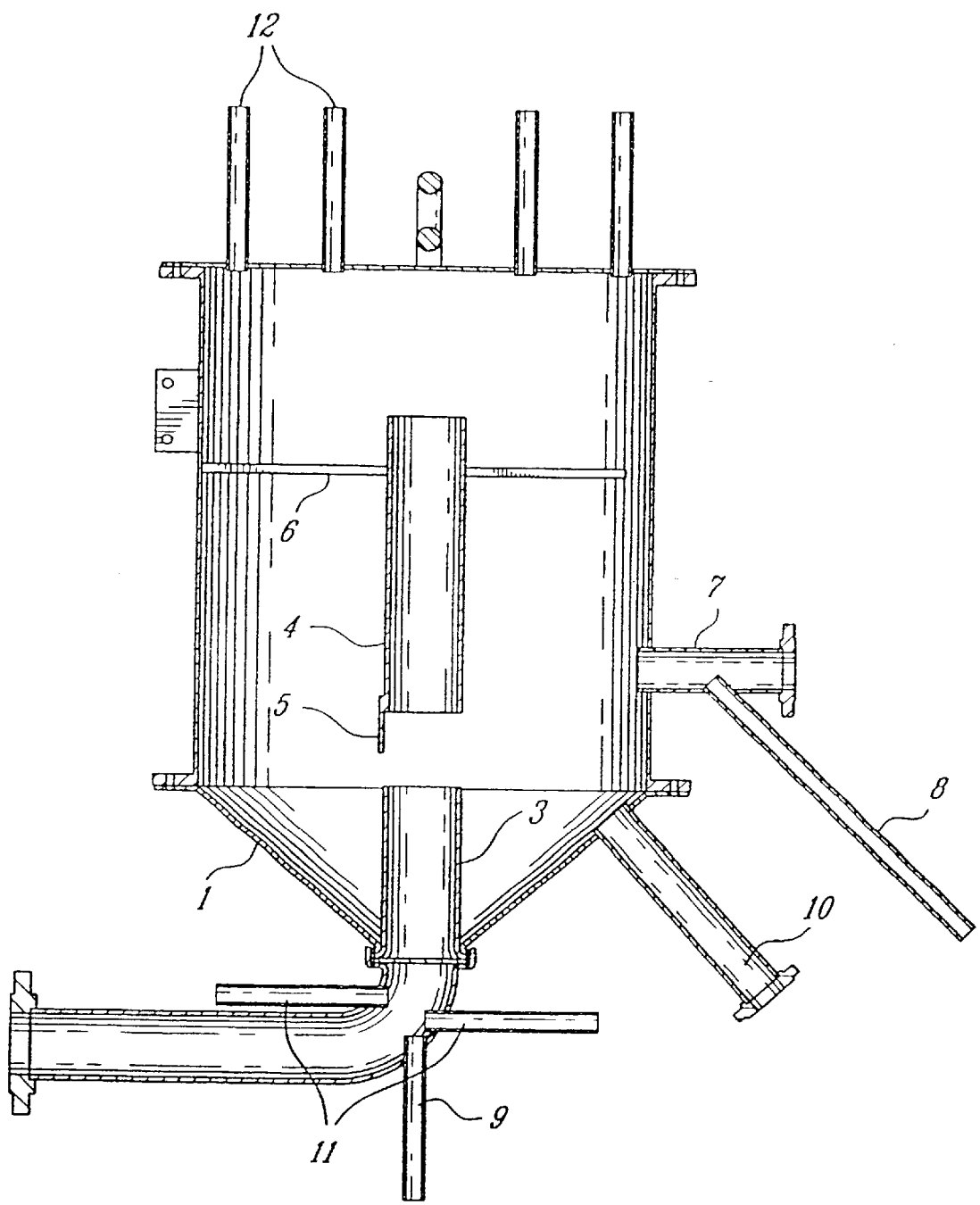
FIG. 6 is a cross-sectional, side elevation view of the filter, in operation.

Referring now to FIG. 6, in operation, hot gas will enter through tuyeres 28, travel up tube 30 and continue up tube 32. This will effectively siphon granular material up tube 32 and form a fluidized bed therein. As gas exits the top of tube 32, it will entrain the fluidized granular material which will fall down towards the bottom 12 of vessel 10. This will create a constant recirculation of granular filtration material in vessel 10. Gas exiting from outlet 16 will have had contact with granular material going up tube 32 and falling down around tube 32. It is to be understood that the dimensions of cylinder 32 will need to be sufficient to ensure appropriate contact time between the gas and the filtering granules. The contact time will preferably be about 2 seconds.

It is to be noted that some of the granules resting in the bottom 12 of vessel 10 serve as a support material for the fluidized granules rather than directly participate in the filtration.

Thus, the novel hot gas filter uses an "impact" rather than 'surface layer' mechanism to filter particles of size down to 1 micron or less with high efficiencies. The entrained fluidized-bed column advantageously a) continuously renews the filtering media and b) homogenizes the bulk of the filtering media.

The novel filter apparatus is advantageously equipped with an appropriate system of tubes, valves and automation instrumentation ensuring its continuous operation, regeneration cycles, and back flushes if need be. It is to be understood that tube diameters will be sufficiently large to avoid fouling and that inclination angles will also be selected to provide proper operation. The materials used for making the various parts of filtration vessel 10 will be selected for their capacity to withstand erosion and high temperature regimes. Advantageously, portions of the filtration vessel exposed to high temperature will be lined with suitable insulating and refractory material.

Finally, as previously mentioned, vessel 10 is provided with various back flushing pipes 24 bringing in back flushing air or inert gas pulses. Pipes 24 are connected to gas outlet 16, the top of vessel 10 and upstream of gas inlet 12. The purpose of flushing pipes 24 is to periodically clean the inlets and outlets, when necessary. The frequency of these flushes is a function of the amount and nature of the material filtered out of the gas. In the worst cases one flush per day was found to be sufficient.

EXAMPLES

Figure 7:
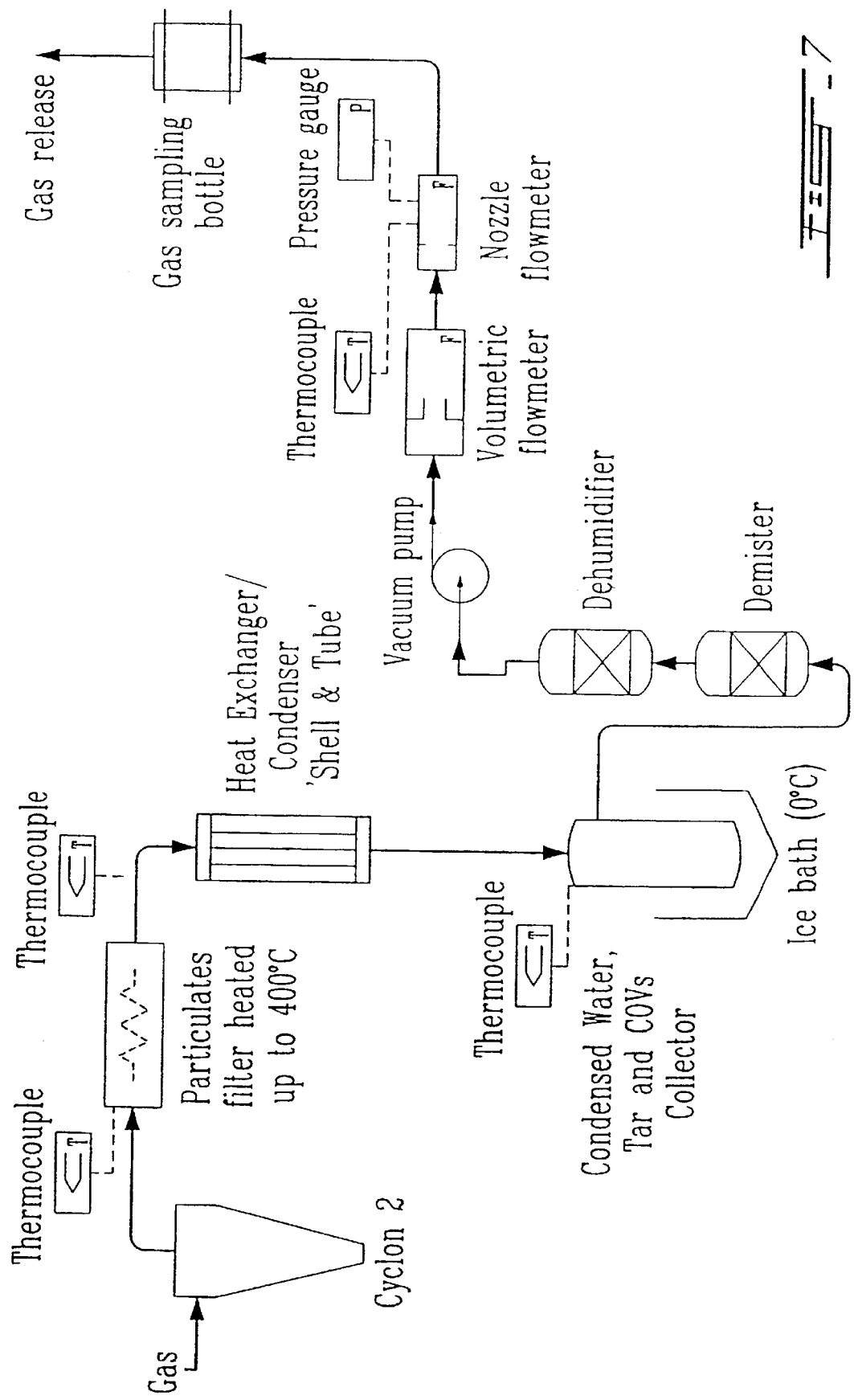
FIG. 7 is pictorial representation of the gas sampling train used to evaluate the particle retention efficiency of the filter.

The apparatus of the present invention was tested on a pilot plant scale. Reference is now made to FIG. 7. The tests relate to the filtration of a producer gas to remove particles. The gas comes from a bubbling fluid bed gasifier fed with residual polyethylene. The hot gas received a pre-treatment in a primary cyclone used to remove the coarser particles. The gasifier is fed with 30 kg of Polyethylene per hour and air at a stoichiometric ratio of 0,3. It operates at a temperature of about 760° C. and produces about 120 Nm3 of producer gas/h. A slip stream of this gas, equal to about 10% of the main flow is diverted through the mobile fed filter, using a HIBON[ liquid ring suction/compression gas pump.

The examples presented below illustrate four different tests:

a) low sphericity fresh quartz as filtering media;
b) high sphericity fresh Ottawa sand as filtering media;

c) high sphericity regenerated Ottawa sand as filtering media;

d) behavior of filter with time.

Pilot tests were conducted at temperatures between 400 and 550° C. Higher temperatures (up to 850° C.) are possible.

The tests showed that with high sphericity sands each operation-regeneration cycle was approximately 60 hours and consequently preferable over low sphericity sands where the operation-regeneration cycle was about 24 hours.

To evaluate the filtration capabilities and efficiency of the filter, the producer gas was sampled upstream and downstream of the filter. For this purpose two identical isokinetic sampling trains depicted in FIG. 7 were used. These samplers allow for both particles and condensable tar evaluation. The particles are retained by a glass fiber filter operated at temperature above 400° C. This precaution was taken in order to avoid deposition of high molecular weight condensable tar which could be measured as particles and thus biasing the sampling results. In order to check the filtration efficiency as function of the filtration time dual samples were taken.

Table 1 below summarizes the main parameters and results of these experiments.

TABLE 1

Tests with novel Granular Mobile Bed Filter

| Parameters | Units | Test 1 | Test 2 | Test 3 | Test 4 |
|---|---|---|---|---|---|
| Tests Code | | NA-38 | NA-47 | NA-49 & 53 | NA-49 & 53 |
| Date | | 04/20/98 | 07/29/98 | 09/01/98 | 12/01/98 |
| Duration | (h) | 13 | 55 | 52 | 52 |
| Sampling time | (h) | 9 to 12 | 1 to 3 | 4 to 8 | 45–48 |
| Sampling duration | (h) | 3 | 3 | 3.5 | 3 |
| Temperature | (° C.) | 510 | 430 | 420 | 420 |
| Gas flowrate | (Nm3/h) | 18 | 10 | 10 | 15 |
| Pressure drop range | (kPa) | 6.8–24.5 | 5.1–23.8 | 8.2–26.9 | 8.2–26.9 |
| Filtering media | | Fresh Quartz (24 mesh) | Fresh Ottawa Sand (24 mesh) | Regen. Ottawa sand (24 mesh) | Regen. Ottawa sand (24 mesh) |
| Particles load before | (mg/Nm3) | 2994 | 5412 | 2482 | 3945 |
| Particles load after | (mg/Nm3) | 73 | 300 | 148 | 227 |
| Particles removal Efficiency | (% w/w) | 97.6 | 94.5 | 94.0 | 94.2 |

TABLE 2

Example of head pressure balance calculations

| | | | | Units |
|---|---|---|---|---|
| PRESSURE LOSS ACROSS THE QUASI FIXED BED | | | | |
| Granular media data | Initial porosity (fixed bed) | $\epsilon$ | 0.39 | |
| | Diameter | Dp | 7.00E–04 | m |
| | | | 0.0276 | in |
| | Nature | Quartz | 24 | mesh |
| | Density | Ps | 2459 | kg/m3 |
| Test conditions | Temperature | T | 20 | C. |
| | Pressure | P | 103800 | Pa |
| | Gas flow rate (normal conditions) | Qn | 2.00E+01 | Nm3/h |
| | Gas flow rate (actual conditions) | Qa | 0.0060 | m3/s |
| | Mass velocity | G | 123.0 | lb/h · ft2 |
| Gas data | Viscosity | $\mu$ | 1.80E–05 | Pa · s |
| | Density | $\rho g$ | 1.29E+00 | kg/m3 |
| | Solids density | $\rho s$ | 2.46E+03 | kg/m3 |
| Quasi fixed-bed data | Diameter | DF | 0.23 | M |
| | Length | L | 0.32 | M |
| Hypothesis | | | | |
| 1 | Gas velocity constant along the bed | | | |
| 2 | Turbulent flow across the bed | | | |
| 3 | K2 - | | 150 | (Ergun equation) |
| 4 | K4 - | | 1.75 | (Ergun equation) |
| 5 | Sphericity (y) | | 0.67 | |
| Preliminary Calculations | Actual flow rate | Qa | 0.006 | m3/s |
| | | | | m/s |
| | | | | s |
| | Gas Velocity | V | 0.136 | |
| | Residence Time | T | 2.358 | |
| Pressure losses | $\Delta P$ | | 3.5 (near threetimeslowerthan through the fixed bed) | Kpa |

TABLE 2-continued

Example of head pressure balance calculations

|  |  |  |  | Units |
|---|---|---|---|---|
| PRESSURE LOSS ACROSS THE FLUID BED | | | | |
| Granular media data | Initial porosity (fixed bed) | $\epsilon$ | 0.39 | |
|  | Diameter | $D_p$ | 7.00E−04 | m |
|  |  |  | 0.0276 | in |
|  | Nature | Quartz | 24 | mesh |
|  | Density | $P_s$ | 2459 | kg/m3 |
| Test conditions | Temperature | T | 20 | C. |
|  | Pressure | P | 103800 | Pa |
|  | Gas flow rate (normal conditions) | Qn | 2.00E+01 | Nm3/h |
|  | Gas flow rate (actual conditions) | Qa | 0.0060 | m3/s |
|  | Mass velocity | G | 123.0 | lb/h · ft2 |
| Gas data | Viscosity | $\mu$ | 1.80E−05 | Pa · s |
|  | Density | $\rho g$ | 1.29E+00 | kg/m3 |
|  | Solids density | $\rho s$ | 2.46E+03 | kg/m3 |
| Fluid bed data | Diameter | Dlf | 0.0762 | m |
|  | Length | Llf | 0.4 | m |
|  | Mass velocity at minimum fluidization | Gmf | 173.80 | lb/h · ft2 |
|  | Reynolds number | Nre | 6.49 | |
|  | Friction factor | Fm | 4 | |
|  | Shape factor | s | 0.67 | |
|  | Void space factor at minimum fluidization | Emf | 0.39 | |
|  | Exponent | N | 1 | |
| Preliminary Calculations | Actual flow rate | Qa | 0.0060 | m3/s |
|  |  |  |  | m/s |
|  |  |  |  | s |
|  | Gas Velocity | V | 1.3 | |
|  | Residence Time | T | 0.306 | |
| Pressure losses calculation | Pressure losses | ΔP | 1.1 | KPa |

Advantageously, the filter of the present invention will be mounted in parallel with similar units. Hence, one filter may be temporarily decommissioned for maintenance purposes without interrupting the production of hot gas from the gasifier.

Although the invention has been described above with respect with one specific form, it will be evident to a person skilled in the art that it may be modified and refined in various ways. It is therefore wished to have it understood that the present invention should not be limited in scope, except by the terms of the following claims.

The embodiments in which exclusive rights are claimed are:

1. A granular filtration apparatus for the removal of particulate material from hot gas by contacting said hot gas with granular filtration material, said apparatus being of the type having a filtration chamber containing granular filtration material and having a tapered lower portion comprising at least one inlet for feeding therein hot gases to be filtered and at least one outlet for drawing filtered hot gas,
   said granular filtration apparatus comprising a filtration unit mounted in the filtration chamber above each inlet, said filtration unit comprising:
      a first tubular member mounted above the inlet so as to prevent granular material from entering or blocking said inlet;
      a second tubular member having a bottom and a top end, said second tubular member being mounted essentially in a co-axial and spaced relationship above said first tubular member;
   whereby during operation, the granular filtration material is siphoned up and fluidized by the hot gases as they travel up the second tubular member, the granular filtration material enters the bottom end of the second tubular member through the space between the first and second tubular member, exits at the top end of the second tubular member and falls outside the second tubular member and towards the tapered lower portion of the filtration chamber to be eventually recirculated and fluidized by the hot gases.

2. The apparatus of claim 1 wherein said filtration unit comprises a single hot gas inlet.

3. The apparatus of claims 1 or 2 wherein said hot gas inlet comprises a gas distribution plate comprising a plurality of gas distribution tuyeres.

4. The apparatus of claims 1 or 2 wherein said filtration vessel is essentially cylindrical and said lower portion of said vessel is conical and tapers to a single gas inlet.

5. The apparatus of claim 4 wherein said first and second tubular members are cylindrical.

6. The apparatus of claim 5 wherein said first tubular member is fastened to said gas distribution plate.

7. The apparatus of claim 6 wherein said second tubular member is fastened by support rods to said filtration vessel.

8. The apparatus of claims 1 or 2 wherein the pressure drop through the filtration apparatus, measured between gas inlet and outlet, is about 0.05 to about 0.20 atm.

9. The apparatus of claims 1 or 2 wherein said chamber is internally lined with a suitable insulating or refractory material so as to withstand operating conditions at temperatures at least as high as 600° C.

10. The apparatus of claim 1 wherein said gas inlet comprises a gas distribution plate fastened to the tapered lower portion of said filtration chamber, said gas distribution plate comprising a plurality of gas distribution tuyeres so as to prevent granular material from entering or blocking said inlet said gas distribution plate being encased in a tubular member open at its top end whereby during operation, the granular filtration material is kept away from said gas distribution plate and entrained and fluidized by the hot gases.

* * * * *